United States Patent Office 3,250,804
Patented May 10, 1966

3,250,804
(α-ALKYLIDENEACYL)PHENOXY- AND PHENYL-
THIO-METHANESULFONIC ACIDS
Edward J. Cragoe, Jr., Lansdale, Pa., assignor to Merck
& Co., Inc., Rahway, N.J., a corporation of New
Jersey
No Drawing. Filed Feb. 27, 1963, Ser. No. 261,476
8 Claims. (Cl. 260—511)

This invention is concerned with (α-alkylideneacyl)-phenoxymethanesulfonic acid and with (α-alkylidene-acyl)phenylmercaptomethanesulfonic acid, as well as the non-toxic, pharmaceutically acceptable salts thereof. In particular, the invention is concerned with compounds having the structural formula

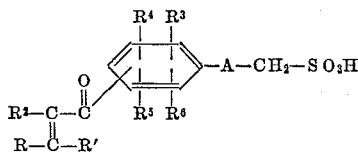

as well as the non-toxic, pharmaceutically acceptable salts thereof and particularly the alkali metal salts and the alkaline earth metal salts thereof, wherein
R, $R^1$ and $R^2$ respectively is selected from the group consisting of
 hydrogen;
 halogen or halogen-like radicals;
 hydroxyl;
 lower aliphatic, lower aliphatic-oxy or lower aliphatic-thio,
  straight or branched chain,
  saturated or unsaturated, and
  unsubstituted or substituted, the substituent
   group(s) being
    alkyl,
    amino,
    halogen-like,
    carboxyl or substituted carboxyl,
    cyano,
    hydroxyl,
    alkyl thio,
    aryl thio,
    arylsulfonyl,
    alkylsulfonyl,
    nitro, and the like
 alicyclic,
  either unsubstituted or unsubstituted, the substituent group(s) being the same as those described above for the aliphatic group;
 aryl or aryl-oxy or aryl-thio, especially a phenyl, phenoxy or phenylthio
  wherein the aryl-(phenyl) moiety can be unsubstituted or a substituent can be attached to one or more of its carbon atoms selected advantageously from
   lower, straight or branched chain—
    alkyl,
    alkoxy,
    alkylthio,
    hydroxyl,
    halogen or halogen-like;
 arylaliphatic, especially a mononuclear-arylaliphatic, advantageously
  phenalkyl which can be attached through an oxygen or a sulfur atom to the grouping

and which is either unsubstituted or substituted in the aryl and/or alkyl portions by substituents of the type hereinbefore described;
 cyano; and wherein
  R and $R^2$ additionally can be linked together to form preferably a 5 to 6 carbon ring with the carbons to which they are attached;
$R^3$, $R^4$, $R^5$ and $R^6$ respectively can represent the same or
 different group selected from
  hydrogen,
  halogen or halogen-like,
  lower aliphatic
   straight or branched chain,
  lower aliphatic-oxy or lower aliphatic-thio
   straight or branched chain,
    unsubstituted or having a substituent of the type described above for attachment to the lower aliphatic group, and wherein the lower aliphatic-oxy or lower aliphatic-thio is advantageously
     lower alkoxy or lower-alkylthio,
      unsubstituted or substituted, as,
       for example,
        carboxyalkoxy
        carboxyalkylthio, and the like;
  aliphaticsulfonyl, especially an
   alkylsulfonyl;
  hydroxy;
  nitro;
  amino;
  carboxy or substituted carboxy, especially carbamoyl and N-substituted carbamoyl;
  aryl, especially phenyl,
   unsubstituted or substituted as described above for attachment to aryl (phenyl) moieties; or wherein
    $R^3$ and $R^4$ and/or
    $R^5$ and $R^6$ can additionally be linked together to form, with the ring carbons to which they are attached, a 5- or 6-membered carbocyclic ring; i.e. to form a naphthylene or an indane or a tetralin system;
A represents
 oxygen or
 sulfur.

In the above definitions and in the claims the term, halogen, embraces halogenlike groups and represents chlorine, bromine, iodine, fluorine, halomethyl, especially trichloromethyl, trifluoromethyl and the like. Also in the above definitions and in the claims, the term amino should be understood to embrace primary, secondary and teritiary amino groups, including N-containing heterocycles as piperidino, 1-pyrrolidinyl, morpholino, 4-lower alkyl-1-piperazinyl and the like, as well as the usual pharmaceutically acceptable salts thereof.

The compounds of this invention possess diuretic, natriuretic and chloruretic properties and are therefore useful in the treatment of many ailments resulting from an excessive retention of electrolytes, such as in the treatment of edema and the like.

Compounds of this invention which have been found to possess especially good natriuretic properties have the structure

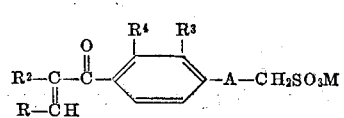

wherein

R is hydrogen or lower alkyl;

$R^2$ is a lower alkyl radical;

$R^3$ and $R^4$ respectively can be the same or different radical selected from
hydrogen,
halogen, particularly
chlorine and
bromine, and
lower alkyl, and when linked together can form —CH=CHCH=CH—;

A is oxygen or sulfur, and

M is an alkali metal or alkaline earth metal or hydrogen.

It will be appreciated that the dosage of the novel compounds of this invention will vary over a wide range depending upon the age and weight of the patient to be treated, upon the particular ailment to be treated, and the relative potency of the selected diuretic agent. For these reasons, tablets, pills, capsules and the like, containing, for example, from about 10 to about 500 mg. or more of active ingredient can be made available for the symptomatic adjustment of the dosage to the individual patient. These dosages appear to be well below the toxic dose of the novel compounds of this invention.

The novel products of this invention can be prepared by the reaction illustrated below:

upon treatment with strong acid, gives the corresponding free acid, compound IX.

The Mannich derivative (VI) advantageously is prepared by reacting the saturated-acyl compound (V) with a salt of a secondary amine such as a di-lower alkylamine or a salt of a cyclic amine such as piperidine, morpholine and the like, in the presence of formaldehyde or paraformaldehyde. Treatment of the Mannich derivative with a base such as aqueous sodium carbonate or, preferably, sodium bicarbonate, either with or without heat, gives the desired unsaturated-acyl compound (VIII), which, upon treatment with strong acid, yields the free acid (IX).

Alternatively, when in product V, $Z=CH_3$ and particularly when $Z=-CH_2Alkyl$, the (saturated-acyl) phenyl-A-methanesulfonate (V) is converted to the unsaturated compound (VIII) by halogenating compound V and then treating the halogenated compound VII with a dehydrohalogenating agent. This procedure is especially useful when the saturated-acyl compound (V) has the structure $R^2=Z$ or where $R^2$ or $Z=CH_3$. The saturated-acyl Compound V advantageously is brominated to form Compound VII which then is converted to Compound VIII by treatment with a deyhdrohalogenating agent such as, advantageously, lithium bromide or lithium chloride in dimethylformamide or silver acetate or silver fluoride in benzene, and the like. Product VIII then can be

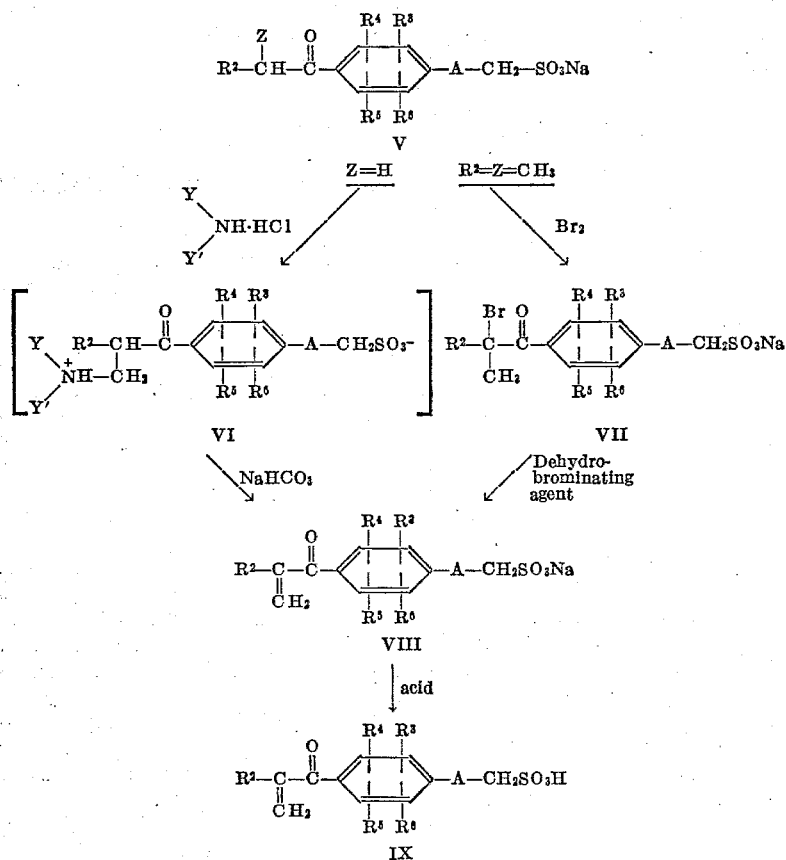

The above reaction scheme shows that the α-alkylideneacylphenyl-A-methanesulfonic acid compounds (IX, A=O or S) can be prepared from the saturated acylphenyl-A-methanesulfonates (V) by two methods, the selection depending principally upon whether Z=H or whether $Z=CH_3$ or $-CH_2Alkyl$.

When Z=H the (saturated-acyl)phenyl-A-methanesulfonate (V) is converted to the α-methyleneacylphenyl-A-methanesulfonate (VIII) by first preparing the Mannich derivative (VI) which, upon treatment with sodium bicarbonate, is converted to compound VIII. Product VIII, converted to the free acid by treatment with a strong acid as hereinbefore described.

Dehydrohalogenation of compounds of the type illustrated by VII, in which $R^2$ and Z are dissimilar, can occur in more than one way and mixtures of isomers can be produced. However, if either $R^2$ or $Z=CH_3$, the one isomer will usually predominate. When mixtures of isomers do form they often can be separated by fractional crystallization. Of course, when $R^2=Z$, only one position isomer is possible, although the possibility of cis-trans isomerism exists.

Compounds having an unsaturated acyl group of the type

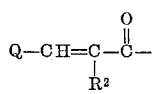

wherein Q is an unsubstituted or substituted aryl (i.e. phenyl) group and $R^2$ is hydrogen or a group of the type hereinabove included in the definition of $R^2$, preferably are prepared by condensing benzaldehyde, for example, in an alkaline medium with compound V (where Z=H) followed by acidification of the reaction mixture.

PREPARATION OF (SATURATED-ACYL) PHENOXYMETHANESULFONATES (V)

The intermediate (saturated-acyl)phenoxymethanesulfonates (V) generally can be made from the known phenols by the following reaction scheme:

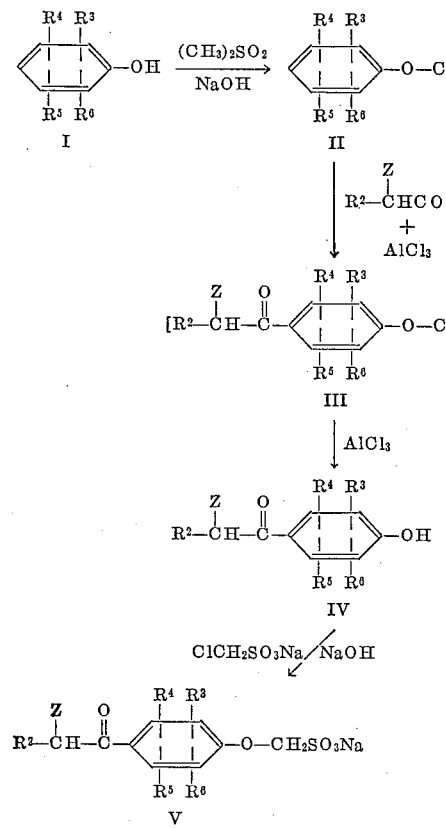

The phenol (I) is converted to the corresponding anisole (II) (or phenetol) by known methods, as by reaction with dimethyl sulfate or diethyl sulfate in the presence of a base such as sodium or potassium hydroxide. Product II then is treated with an acyl halide,

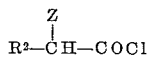

in the presence of anhydrous aluminum chloride and a solvent as ligroin or carbon disulfide. The acylated product III can be converted to the corresponding acylphenol (IV) by subsequent treatment with additional aluminum chloride in a solvent such as heptane.

Product IV upon reaction with an alkali metal salt of halomethanesulfonic acid gives the desired alkali metal salt of (saturated-acyl)phenoxymethanesulfonic acid (V). The reaction preferably is carried out by fusing the reactants in the present of an alkali metal hydroxide although the reaction often can be carried out under other conditions, such as, in aqueous solution under pressure and at elevated temperature of about 200° C.

The alkali metal salt of halomethanesulfonic acid can be any of the alkali metal or alkaline earth metal salts (e.g., sodium, potassium, barium, and the like salt) of chloro-, bromo- or iodomethanesulfonic acid. Conversion of the product to the barium salt is a convenient method of isolation if the particular salt formed is too soluble. Other salts also can be prepared to separate the product from solution, for example the ammonium salts often precipitate upon adding ammonium chloride to a solution of the sodium or other soluble salt of product V. Acidification of the salts (V) with strong acid, by conventional methods, gives the sulfonic acids, some of which may be syrups.

The (saturated-acyl)phenylmercaptomethanesulfonates generally can be made by the following reaction scheme:

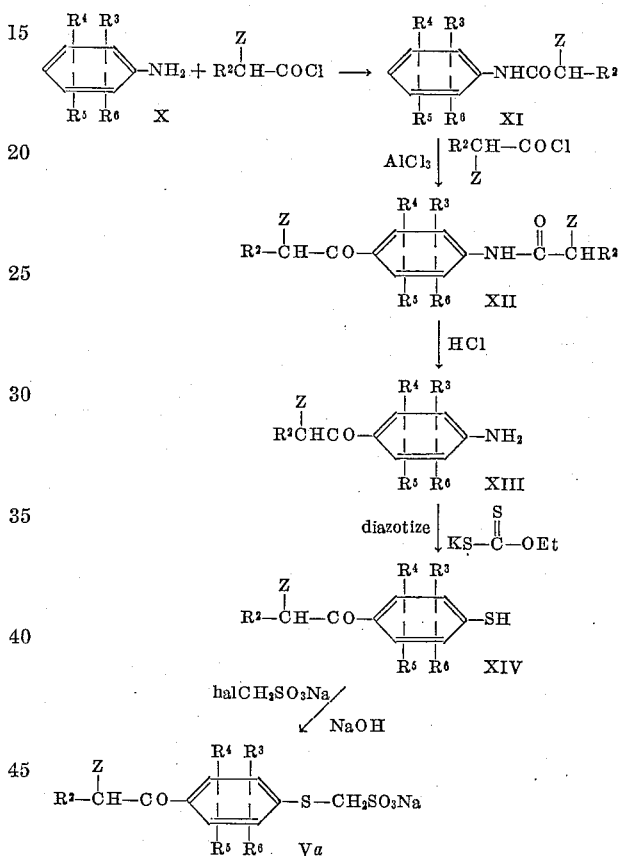

The amino group of the aniline derivative (X) is protected by acylation

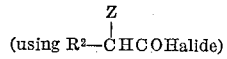

to give XI which upon further acylation in the presence of aluminum chloride yields the (saturated-acyl)anilide (XII). Hydrolysis of XII in strong acid media gives the (saturated-acyl)aniline (XIII) which when diazotized and then reacted with an alkali metal salt of xanthic acid yields the (saturated-acyl)thiophenol (XIV). The thiophenol (XIV) is converted to V–a by reaction with an alkali metal or alkaline earth metal salt of halomethanesulfonic acid by the method described above for converting IV to V except the reaction proceeds quite satisfactorily at reflux.

While, for simplicity sake, the reaction scheme illustrating the preparation of the α-alkylideneacylphenoxymethane sulfonic acid and the α-alkylideneacylphenylthiomethanesulfonic acid (IX) shows the preparation of para-acylphenyl-A-methanesulfonic acid compounds, the methods illustrated and described above also can be employed to make the other position isomers as well.

It sometimes is more convenient, however, to prepare the ortho isomers by the Fries Rearrangement illustrated below. The R's in the following structures are attached to the phenyl nucleus so as to leave one of the ortho positions unsubstituted.

Fries Rearrangement

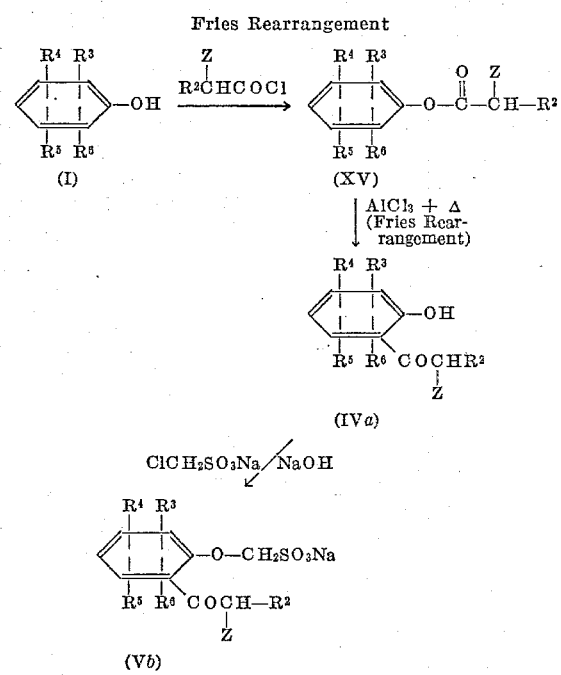

According to the Fries Rearrangement procedure illustrated above, the phenol (I) initially is esterified by reaction with an acyl halide,

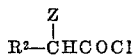

to form the corresponding phenolic ester (XV) which is rearranged to the ortho-acylphenol (IVa) upon heating with aluminum chloride. The ortho-acylphenol (IVa) is converted to the desired ortho-acylphenoxymethanesulfonate (Vb) by treatment with an alkali metal or alkaline earth metal salt of halomethanesulfonic acid in the presence of, e.g., sodium hydroxide following substantially the same procedure described above for converting IV to V.

The product Vb then can be converted to the ($\alpha$-alkylideneacyl)phenyl-A-methanesulfonate (VIII) and if desired to the corresponding sulfonic acid (IX) following substantially the same procedures described above for converting V to VIII to IX.

While the Fries Rearrangement is especially useful for preparing the ortho-isomers, it can be used to prepare para-isomers also.

Although the above discussion outlines general methods suitable for the preparation of the novel compounds of this invention, it is to be understood that the methods described above as well as those described in the following examples are illustrative of those methods which can be employed and are not to be construed as limiting the invention to the particular methods or to the particular compounds specifically described.

*Example 1.—Sodium 2,3-dichloro-4-(2-methylenebutyryl)phenoxymethanesulfonate*

Step A: Preparation of 2,3-dichloro-4-butyrylphenol.—
Butyryl chloride (128.0 g., 1.2 mole) and 2,3-dichloroanisole (197.7 g., 1.11 mole) are added to carbon disulfide (400 ml.) in a 2-liter, 3-necked, round bottomed flask equipped with a stirrer, reflux condenser [protected by a calcium chloride tube] and a Gooch sleeve bearing a 250 ml. Erlenmeyer flask containing anhydrous aluminum chloride (160 g., 1.2 mole). While the reaction mixture is cooled in an ice bath, the aluminum chloride is added in small portions with stirring at such a rate that the temperature of the reaction mixture does not exceed 20-25° C. The ice bath is removed and the mixture stirred at room temperature for 1 hour, then in a water bath at 55° C. for 45 minutes and then kept at room temperature overnight. n-Heptane (400 ml.) and aluminum chloride (160 g., 1.2 mole) are added, the condenser set for distillation, the mixture stirred and heated in a water bath (heated by means of a steam bath) and the carbon disulfide distilled. A second portion of heptane (400 ml.) is added, the condenser set for reflux, the reaction mixture stirred and heated in a bath at 80° C. for three hours and then allowed to cool. The heptane is decanted and the residue hydrolyzed by the slow addition of a solution of concentrated hydrochloric acid (120 ml.) in water (1500 ml.). The brown solid that separates is collected by suction filtration, washed well with water and dissolved in ether. The ether solution is extracted with 2 liters or 5% sodium hydroxide used in portions. The sodium hydroxide extract is stirred with decolorizing chracoal and filtered through Super-cel by suction. Upon acidification, the light brown solid that separates is collected by filtration, washed with water and dried at 100° C. for three hours. The dried solid is dissolved in hot benzene (1 liter) and the insoluble matter removed by filtration. Upon cooling, the slightly colored solid that separates is dissolved in hot benzene (750 ml.), the solution allowed to cool to room temperature and then chilled at 10° C. in a refrigerator to give 203 g. (85%), of 2,3-dichloro-4-butyrylphenol, M.P. 109–110.5° C. which is collected by filtration.

*Analysis.*—Calculated for $C_{10}H_{10}Cl_2O_2$: C, 51.52; H, 4.32; Cl, 30.42. Found: C, 51.70; H, 4.24; Cl, 30.32.

Step B: Preparation of sodium 2,3-dichloro-4-butyrylphenoxymethanesulfonate.—2,3 - dichloro - 4-butyrylphenol (10.5 g., 0.045 mole), sodium chloromethanesulfonate monohydrate (7.71 g., 0.045 mole) and sodium hydroxide (1.80 g., 0.045 mole) dissolved in 6 ml. of water are combined and mixed in a 100 ml. round-bottomed flask which is open to the atmosphere. The flask is placed in a Wood's metal bath at 100° C., and the temperature gradually raised to 180° C. over a period of 30 minutes. During this time, the water gradually evaporates and the solid mass then is heated at 220–240° C. for 4 hours and cooled. The product obtained is recrystallized first from 100 ml. of water and then from 200 ml. of 85% aqueous ethanol to give 8.6 g. (55%) of sodium 2,3-dichloro-4-butyrylphenoxymethanesulfonate, M.P. 325–326° C.

*Analysis.*—Calculated for $C_{11}H_{11}Cl_2O_5SNa$: C, 37.84; H, 3.18; Cl, 20.31. Found: C, 38.18; H, 3.37; Cl, 20.30.

Step C: Preparation of sodium 2,3 - dichloro - 4 - (2-methylenebutyryl)phenoxymethanesulfonate.—A 200 ml. round-bottomed flask protected with a calcium chloride drying tube is charged with sodium 2,3-dichloro-4-butyrylphenoxymethanesulfonate (3.49 g., 0.01 mole), paraformaldehyde (330 mg., 0.011 mole), dimethylamine hydrochloride (900 mg., 0.011 mole), and glacial acetic acid (1 ml.) and heated on a steam bath for 2½ hours. The viscous mixture formed then is treated with saturated aqueous sodium bicarbonate (70 ml.) and water (30 ml.) and heated for 1½ hours on the steam bath. The solution is cooled and treated with 6 N hydrochloric acid to pH 4.5. To the clear solution is added barium chloride dihydrate (1.22 g., 0.005 mole) in water (10 ml.). The barium salt that precipitates is removed by filtration and dissolved in 500 ml. of boiling water. The hot solution is treated with a solution of sodium sulfate (710 mg., 0.005 mole) in water (10 ml.) and filtered through a pad of diatomaceous earth to remove the precipitated barium sulfate. The filtrate then is evaporated to dryness in vacuo at 60° C. and the product remaining dissolved in 95% ethanol (300 ml.) filtered and treated with ether (400 ml.). The yield of sodium 2,3-dichloro-4-(2-methylenebutyryl)phenoxymethanesulfonate which separates is 2.65 g. (74%). After several recrystallizations from a mixture of ethanol (3 parts) and ether (4 parts) the compound melts at 228° C. with decomposition.

Analysis.—Calculated for $C_{12}H_{11}Cl_2O_5SNa$: C, 39.90; H, 3.07; Cl, 19.63. Found: C, 39.99; H, 3.59; Cl, 19.20.

*Example 2.—3 - chloro - 4-(2-methylenebutyryl)phenoxymethanesulfonic acid and its sodium and barium salts*

By replacing the 2,3-dichloro-4-butyrylphenol employed in Example 1, Step B, by an equimolecular quantity of 3-chloro-4-butyrylphenol and following substantially the same procedure decsribed in Example 1, Step B, there is obtained sodium 3-chloro-4-butyrylphenoxymethanesulfonate. This product then is converted to sodium 3-chloro-4-(2 - methylenebutyryl)phenoxymethanesulfonate by reaction with paraformaldehyde, dimethylamine hydrochloride, glacial acetic acid and subsequently with aqueous sodium bicarbonate by substantially the same procedures described in Step C of Example 1 using the same molar proportions of reactants as there described. The sodium salt then is converted to the barium salt of 3-chloro - 4 - (2-methylenebutyryl)phenoxymethanesulfonic acid by the method described in Step C of Example 1 and then reconverted to the sodium salt by treatment with sodium sulfate also as described in Step C of Example 1. The sodium salt, upon treatment with aqueous sulfuric acid is converted to 3-chloro-4-(2-methylenebutyryl)phenoxymethanesulfonic acid, a viscous syrup.

*Example 3.—Sodium 2,3 - dimethyl-4-(2-methylenebutyryl)phenoxymethanesulfonate*

Step A: *Preparation of 2,3-dimethyl-4-butyrylphenol.—* By replacing the 2,3-dichloroanisole employed in Example 1, Step A, by an equimolecular quantity of 2,3-dimethylanisole and following substantially the same procedure and using the same reactants and reagents called for in Step A of Example 1, there is obtained 2,3-dimethyl-4-butyrylphenol.

Step B: *Preparation of sodium 2,3-dimethyl-4-butyrylphenoxymethanesulfonate.—*By replacing the 2,3-dichloro-4-butyrylphenol and the sodium chloromethanesulfonate monohydrate employed in Example 1, Step B, by equimolecular quantities of 2,3-dimethyl-4-butyrylphenol and sodium bromomethanesulfonate and following substantially the same procedure and using the other reactants and reagents called for in Step B of Example 1, there is obtained sodium 2,3-dimethyl-4-butyrylphenoxymethanesulfonate.

Step C: *Preparation of sodium 2,3 - dimethyl - 4 - (2-methylenebutyryl)phenoxymethanesulfonate.—*By following substantially the same procedure described in Example 1, Step C but replacing the sodium 2,3-dichloro-4-butyrylphenoxymethanesulfonate by an equimolecular quantity of sodium 2,3-dimethyl-4-butyrylphenoxymethanesulfonate, there is obtained sodium 2,3-dimethyl-4-(2-methylenebutyryl)phenoxymethanesulfonate.

*Example 4.—Sodium, barium and potassium salts of 3-methyl - 4-(2 - methylenebutyryl)phenoxymethanesulfonic acid*

Step A: *Preparation of 3-methyl-4-butyrylphenol.—* By replacing the 2,3-dichloroanisole employed in Example 1, Step A, by an equimolecular quantity of 3-methylanisole and following substantially the same procedure and using the other reactants and reagents called for in Example 1, Step A, there is obtained 3-methyl-4-butyrylphenol.

Step B: *Preparation of sodium 3-methyl-4-butyrylphenoxymethanesulfonate.—*By replacing the 2,3-dichloro-4-butyrylphenol employed in Step B of Example 1 by an equimolecular quantity of 3-methyl-4-butyrylphenol and following substantially the same procedure and using the other reactants and reagents called for in Step B of Example 1, there is obtained sodium 3-methyl-4-butyrylphenoxymethanesulfonate.

Step C: *Preparation of sodium, barium, and potassium salts of 3-methyl-4-(2-methylenebutyryl)-phenoxymethanesulfonic acid.—*By replacing the sodium 2,3-dichloro-4-butyrylphenoxymethanesulfonate employed in Example 1, Step C, by an equimolecular quantity of sodium 3-methyl-4-butyrylphenoxymethanesulfonate and following substantially the same procedure and using the other reactants and reagents called for in Example 1, Step C, through the preparation of the barium salt, there are obtained first the sodium and then the barium salts of 3-methyl-4-(2 - methylenebutyryl)phenoxymethanesulfonic acid. The barium salt that is obtained is dissolved in 500 ml. of boiling water. The solution then is treated with a solution of potassium sulfate (0.005 mole) in water (10 ml.) and filtered through a pad of diatomaceous earth to remove the precipitated barium sulfate. The filtrate is evaporated to dryness in vacuo at 60° C. The residue is taken up in 95% ethanol (300 ml.), filtered, and treated with ether (400 ml.) to give potassium 3-methyl-4-(2-methylenebutyryl)phenoxymethanesulfonate.

*Example 5.—Sodium 2,3-dichloro-4-(2-ethylidenebutyryl)phenoxymethanesulfonate*

Step A: *Preparation of 2,3-dichloro-4-(2-ethylbutyryl)-phenol.—*A mixture of 2,3-dichloroanisole (53.11 g., 0.3 mole), carbon disulfide (350 ml.) and 2-ethylbutyryl chloride (80.77 g., 0.6 mole) is treated, under anhydrous conditions, with aluminum chloride power (40 g., 0.3 mole) over a period of 5 minutes with stirring. The mixture stirred for 6 hours at room temperature and then allowed to stand at room temperature overnight. The mixture then is heated in a 55° C. water bath until the evolution of hydrogen chloride ceases (1½ hours), cooled to room temperature and treated, under anhydrous conditions, with aluminum chloride power (40 g., 0.3 mole) over a period of 5 minutes with stirring. The mixture then is heated in a 55° C. water bath with stirring for 1½ hours. The carbon disulfide is removed under reduced pressure and an equal volume of dry heptane is added to the residue. The resulting mixture then is heated on a steam bath with stirring for three hours. After cooling to room temperature, the heptane is decanted and the residue is added to a mixture of ice (450 g.) and concentrated hydrochloric acid (45 ml.). The resulting oil is extracted with ether, dried over anhydrous sodium sulfate and the ether then removed under reduced pressure. The remaining material is treated with excess 5% aqueous sodium hydroxide solution and heated under reflux for 1 hour, then cooled and extracted with ether to remove insoluble oil. The clear aqueous solution is acidified with concentrated hydrochloric acid and the resulting oil is extracted with ether, the ethereal solution dried over anhydrous sodium sulfate and the ether again removed under reduced pressure. Distillation of the residual oil gives 34.45 g. (44%) of the product in the form of a liquid, boiling point 140–142° C. at 0.5 mm. pressure. After three recrystallizations from hexane, 2,3-dichloro-4-(2-ethylbutyryl)phenol is obtained in the form of white needles, M.P. 85–86° C.

Analysis.—Caluculated for $C_{12}H_{14}Cl_2O_2$; C, 55.19; H, 5.40; Cl, 27.15. Found: C, 55.21; H, 5.64; Cl, 26.98.

Step B: *Preparation of sodium 2,3-dichloro-4-(2-ethylbutyryl)phenoxymethanesulfonate.—*By replacing the 2,3-dichloro-4-butyrylphenol employed in Example 1, Step B, by an equimolecular quantity of 2,3-dichloro-4-(2-ethylbutyryl)phenol and following substantially the same procedure and using the other reactants and reagents called for in Step B of Example 1, there is obtained sodium 2,3-dichloro-4-(2-ethylbutyryl)phenoxymethanesulfonate.

Step C: *Preparation of sodium 2,3-dichloro-4-(2-bromo-2-ethylbutyryl)phenoxymethanesulfonate.—*To a solution of sodium 2,3-dichloro-4-(2-ethylbutyryl)phenoxymethanesulfonate (0.5 mole) in 250 ml. of acetic acid is added with stirring 48% hydrobromic acid (2 drops) followed by the dropwise addition of bromine (0.05 mole) in 60 ml. of acetic acid. After the addition is complete, the mixture is stirred for 15 minutes and then the volatile materials are removed by distillation at reduced pressure. The residue contains sodium 2,3-dichloro-4-(2-bromo-2-ethylbutyryl)phenoxymethanesulfonate which is of adequate purity for use in the next step.

*Step D: Preparation of sodium 2,3-dichloro-4-(2-ethylidenebutyryl)phenoxymethanesulfonate.*—The sodium 2,3-dichloro-4-(2-bromo-2-ethylbutyryl)phenoxymethansulfonate obtained as described above (0.05 mole) is dissolved in 140 ml. of dimethylformamide and lithium chloride (6.36 g., 0.15 mole) added. The mixture is stirred and heated on a steam bath for about 2¼ hours and then the solvent is removed by reduced pressure distillation. The residue is dissolved in water and the product converted to the barium salt and then to the sodium salt by substantially the same procedure described in Example 1, Step C, to give sodium 2,3-dichloro-4-(2-ethylidenebutyryl)phenoxymethanesulfonate.

*Example 6.—Sodium 3-chloro-4-methacryloylphenylthiomethansulfonate*

*Step A: Preparation of 2'-chloro-4'-propionamidopropiophenone.*—To the paste obtained by stirring together N-propionyl-3-chloroaniline (36.8 g., 0.2 mole) and aluminum chloride (108 g., 0.8 mole) is added propionyl chloride (37.2 g., 0.4 mole) during 3 hours. After the addition is completed, the mixture is stirred 3 hours on the steam bath and the reaction mixture then poured on ice. The product precipitates as an oil which slowly crystallizes. Recrystallization from ethanol yields 12 g. of 2'-chloro-4'-propionamidopropiophenone, M.P. 111–114° C. Further recrystallizations from ethanol give material melting at 115–117° C.

*Analysis.*—Calculated for $C_{12}H_{14}ClNO_2$: C, 60.13; H, 5.89; N, 5.84. Found: C, 60.29; H, 5.76; N, 5.76.

*Step B: Preparation of 2'-chloro-4'-aminopropiophenone.*—A mixture of 5.4 g. (0.022 mole) of 2'-chloro-4'-propionamidopropiophenone and 25 cc. of 6 N hydrochloric acid is stirred on the steam bath for 1.5 hours. The clear solution is made basic to precipitate the product which is recrystallized from ethanol to obtain 2.2 g. of 2'-chloro-4'-aminopropiophenone, M.P. 98–101° C.

*Analysis.*—Calculated for $C_9H_{10}ClNO$: C, 58.86; H, 5.49; N, 7.63. Found: C, 58.76; H, 5.38; N, 7.55.

*Step C: Preparation of 3-chloro-4-propionylthiophenol.*—In a 2-liter flask, equipped with a mechanical stirrer and thermometer and cooled in an ice bath is placed concentrated hydrochloric acid (116 ml.) and crushed ice (116 g.). The stirrer is started and 2'-chloro-4'-aminopropiophenone (102.8 g., 0.58 mole) is added in small portions. The mixture is cooled to 0° C. and a cold solution of sodium nitrite (42.8 g., 0.62 mole) in water (96.8 ml.) is added slowly. The temperature is maintained below 4° C. during the addition and the mixture kept at this temperature until it is used in the subsequent reaction.

In a 2-liter flask equipped with a thermometer, dropping funnel and mechanical stirrer is placed a solution of potassium ethyl xanthate (127 g., 0.794 mole) in water (139 ml.). The solution is warmed to 40–45° C. and maintained at this temperature during the slow addition of the above diazonium solution. The addition requires about 2 hours. After standing overnight, the aqueous supernatant solution is decanted from the organic product and the latter dissolved in ether. The aqueous portion is extracted with ether, the ethereal extracts combined, washed with water, 10% sodium hydroxide solution and finally with water until the aqueous wash is neutral.

The ether solution is dried over anhydrous sodium sulfate and the solvent removed by distillation. The residual material is dissolved in boiling 95% ethanol (386 ml.). The heat source is removed and potassium hydroxide pellets (135 g.) are added slowly so that the solution continues to boil. The mixture is mechanicaly stirred and refluxed for 18 hours, the ethanol then removed by distillation at reduced pressure and the residue dissolved in water (390 ml.) and washed with ether. The aqueous solution is filtered and the filtrate cooled and acidified with concentrated hydrochloric acid. The product that separates is extracted with ether, washed with water and dried over anhydrous sodium sulfate. The solution is filtered and the ether removed from the filtrate by distillation. The residue consists of 3-cholor-4-propionylthiophenol which is pure enough for use in the next step although it can be further purified by reduced pressure distillation.

*Step D: Preparation of sodium 3-chloro-4-propionylphenylthiomethanesulfonate.*—The 2,3 - dichloro - 4 - butyrylphenol used in Example 1, Step B, is replaced by an equimolar amount of 3-chloro-4-propionylthiophenol and the reaction carried out as described in Example 1, Step B, except that the reaction temperature is 170–190° C. instead of 220–240° C. to give sodium 3-chloro-4-propionylphenylthiomethanesulfonate.

*Step E: Preparation of sodium 3-chloro-4-methacryloylphenylthiomethanesulfonate.*—The sodium 2,3-dichloro-4-butyrylphenoxymethanesulfonate used in Example 1, Step C, is replaced by an equimolar amount of sodium 3-chloro-4-propionylphenylthiomethanesulfonate and the reaction carried out as described in Example 1, Step C, yielding sodium 3 - chloro - 4 - methacryloylphenylthiomethanesulfonate.

*Example 7.—Sodium 2,3-dichloro-4-(2-methylenebutyryl)-phenylthiomethanesulfonate*

*Step A: Preparation of N-butyryl-2-3-dichloroaniline.*—2,3-dichloroaniline (162 g., 1.0 mole) is added dropwise with stirring to butyric anhydride (189.6 g., 1.2 moles) over a period of 30 minutes. The mixture is heated and stirred on a steam bath for an hour and then the volatile material removed by reduced pressure distillation (rotary evaporator). The residue is treated with water and the solid that forms collected on a filter, washed with water and pressed dry as possible. The remaining product is dissolved in ether, washed with water, aqueous sodium bicarbonate solution and finally with water. After drying over anhydrous sodium sulfate, the ether solution is filtered and the ether removed by distillation. The residue is collected on a filter funnel and washed with a little petroleum ether (B.P. 30–60° C.). The N-butyryl-2,3-dichloroaniline obtained is adequately pure for use in the next step; however, it may be further purified by recrystallization from a mixture of ethanol and water.

*Step B: Preparation of sodium 2,3-dichloro-4-(2-methylenebutyryl)phenylthiomethanesulfonate.*—By replacing the N-propionyl-3-chloroaniline and the propionyl chloride employed in Example 6, Step A, by equimolecular quantities of N-butyryl-2,3-dichloroaniline and butyryl chloride respectively and then following the procedures and using the other reagents and reactants called for in Steps A through E of Example 6, there is obtained sodium 2,3 - dichloro - 4 - (2 - methylenebutyryl)phenylthiomethanesulfonate.

*Example 8.—Sodium 4-(2-methylenebutyryl)phenoxymethanesulfonate*

By replacing the 2,3-dichloroanisole employed in Example 1, Step A, by an equimolecular quantity of anisole, and following substantially the same procedures and using the other reagents and reactants employed in Example 1, Steps A through C, there is obtained sodium 4-(2-methylenebutyryl)phenoxymethanesulfonate

*Example 9.—Sodium 3-bromo-4-(2-methylenebutyryl)-phenoxymethanesulfonate*

By replacing the 2,3-dichloroanisole employed in Example 1, Step A, by an equimolecular quantity of 3-bromoanisole (prepared by reacting 3-bromophenol with dimethylsulfate in aqueous sodium hydroxide solution) and following substantially the same procedures and using the other reagents and reactants employed in Example 1, Steps A through C, there is obtained sodium 3-bromo-4-(2-methylenebutyryl)phenoxymethanesulfonate.

*Example 10.—Sodium 4-(2-methylenebutyryl)-1-naphthyl-oxymethanesulfonate*

By replacing the 2,3-dichloro-4-butyryl-phenol employed in Example 1, Step B, by an equimolecular quantity of 4-butyryl-1-naphthol, and following substantially the same procedures and using the other reagents and reactants employed in Steps B and C of Example 1, there is obtained sodium 4-(2-methylenebutyryl)-1-naphthyl-oxymethanesulfonate.

While the above examples describe the preparation of certain compounds which are illustrative of the novel products of this invention by certain procedures that illustrate preferred methods for their preparation, it is to be understood that the invention is not to be limited to the specific compounds described in the examples or by the specific reaction conditions described for their preparation, but is to be understood to embrace variations and modifications thereof which fall within the scope of the appended claims.

What is claimed is:

1. A product selected from the group consisting of a compound having the structural formula:

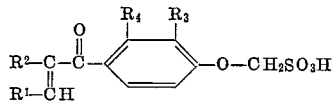

and salts thereof with pharmaceutically acceptable bases, wherein $R^1$ is selected from the group consisting of hydrogen and lower alkyl;

$R^2$ is lower alkyl;

$R^3$ and $R^4$ respectively is selected from the group consisting of hydrogen, lower alkyl, chlorine and bromine, and $R^3$ and $R^4$ taken jointly represent

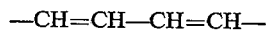

2. A salt derived from a pharmaceutically acceptable base, wherein the acid is a product having the structural formula

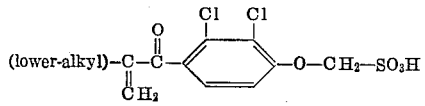

3. A salt derived from a pharmaceutically acceptable base, wherein the acid is a product having the structural formula

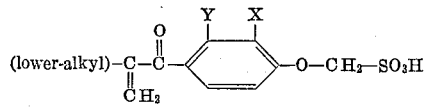

wherein X is lower-alkyl and Y is lower-alkyl.

4. A salt of 2,3-dimethyl-4-(2-methylenebutyryl)phenoxymethanesulfonic acid wherein the cation is derived from a pharmaceutically acceptable base.

5. A salt of a product having the structural formula

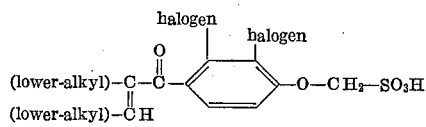

wherein the cation is derived from a pharmaceutically acceptable base.

6. A salt of 4-(2-methylenebutyryl)-1-naphthyloxymethanesulfonic acid wherein the cation is derived from a pharmaceutically acceptable base.

7. Sodium 2,3-dichloro-4-(2-methylene-butyryl)phenoxymethanesulfonate.

8. A product selected from the group consisting of a compound having the structural formula

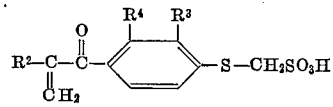

and salts thereof with pharmaceutically acceptable bases, wherein $R^2$ is lower alkyl;

$R^3$ is selected from the group consisting of hydrogen, lower alkyl, chlorine and bromine;

$R^4$ is selected from the group consisting of hydrogen, lower alkyl, chlorine and bromine.

References Cited by the Examiner

Schultz et al., J. Med. Pharm. Chem., 1962, vol. 5, pp. 660–662.

LORRAINE A. WEINBERGER, *Primary Examiner.*